United States Patent
Han et al.

(10) Patent No.: US 10,931,204 B1
(45) Date of Patent: Feb. 23, 2021

(54) ISOLATED RESONANT CONVERTER WITH FIXED OUTPUT RIPPLE

(71) Applicant: Monolithic Power Systems, Inc., San Jose, CA (US)

(72) Inventors: Di Han, San Jose, CA (US); Jian Jiang, Los Gatos, CA (US); Panyin Liu, Chengdu (CN)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 16/681,818

(22) Filed: Nov. 12, 2019

(51) Int. Cl.
*H02M 3/335* (2006.01)

(52) U.S. Cl.
CPC ... *H02M 3/33576* (2013.01); *H02M 3/33507* (2013.01)

(58) Field of Classification Search
CPC ......... H02M 3/33523; H02M 3/33553; H02M 3/33576; H02M 3/3307; H02M 3/3369; H02M 2001/0058
See application file for complete search history.

(56) References Cited

U.S. PATENT DOCUMENTS

| | | | | |
|---|---|---|---|---|
| 4,777,575 A * | 10/1988 | Yamato | | H05B 6/666 363/21.1 |
| 9,407,155 B2 | 8/2016 | Wang et al. | | |
| 9,595,885 B2 * | 3/2017 | Wang | | H02M 7/217 |
| 9,762,128 B2 * | 9/2017 | Zhang | | H02M 1/08 |
| 9,893,635 B2 * | 2/2018 | Lin | | H02M 1/08 |
| 10,170,974 B1 * | 1/2019 | Oh | | H02M 1/083 |
| 10,186,975 B2 * | 1/2019 | Ouyang | | H02M 1/08 |
| 10,250,143 B1 | 4/2019 | Jiang et al. | | |
| 10,566,907 B1 * | 2/2020 | Hayasaki | | H02M 3/33569 |
| 2010/0110738 A1 * | 5/2010 | Shimizu | | H02M 1/4225 363/124 |
| 2010/0321956 A1 * | 12/2010 | Yeh | | H02M 3/33507 363/16 |
| 2011/0169426 A1 * | 7/2011 | Sadwick | | H05B 41/3927 315/307 |
| 2011/0205761 A1 * | 8/2011 | Tschirhart | | H02M 3/3376 363/21.02 |
| 2011/0267853 A1 * | 11/2011 | Yang | | H02M 3/33515 363/56.01 |
| 2012/0099344 A1 * | 4/2012 | Adragna | | H02M 3/3372 363/21.03 |
| 2013/0114307 A1 * | 5/2013 | Fang | | H02M 3/33507 363/21.01 |

(Continued)

*Primary Examiner* — Yusef A Ahmed
(74) *Attorney, Agent, or Firm* — Perkins Coie LLP

(57) ABSTRACT

An isolated resonant converter has an analog comparator with hysteresis for generating a first ON/OFF signal, a digital isolator for outputting a second ON/OFF signal, an oscillator for providing a clock pulse signal with a frequency, and a primary pulse width modulator coupled to receive the clock pulse signal and the second ON/OFF signal. An output voltage of the isolated resonant converter is controlled by the analog comparator within a predefined range. The second ON/OFF signal is electrically isolated from the first ON/OFF signal. The primary pulse width modulator controls the switching of the isolated resonant converter in response to the clock pulse signal during the logic high state of the second ON/OFF signal and stops the switching of the isolated resonant converter during the logic low state of the second ON/OFF signal.

14 Claims, 5 Drawing Sheets

(56) References Cited

U.S. PATENT DOCUMENTS

| | | | |
|---|---|---|---|
| 2013/0301311 A1* | 11/2013 | Wang | H02M 3/33515 |
| | | | 363/21.13 |
| 2014/0016362 A1* | 1/2014 | Adragna | H02M 3/3376 |
| | | | 363/21.02 |
| 2015/0103567 A1* | 4/2015 | Wang | H02M 3/33592 |
| | | | 363/21.13 |
| 2016/0352231 A1* | 12/2016 | Quigley | H02M 3/33592 |
| 2017/0093296 A1* | 3/2017 | Chen | H02M 1/088 |
| 2017/0110973 A1* | 4/2017 | Chen | H02M 1/083 |
| 2018/0054134 A1* | 2/2018 | Moon | H02M 3/3376 |
| 2020/0099255 A1* | 3/2020 | Al-Shyoukh | H02M 3/3374 |
| 2020/0195124 A1* | 6/2020 | Mayell | H02M 3/156 |
| 2020/0195154 A1* | 6/2020 | Mayell | H02M 3/33569 |
| 2020/0195155 A1* | 6/2020 | Colbeck | H02M 1/36 |

* cited by examiner

ISOLATED RESONANT CONVERTER WITH FIXED OUTPUT RIPPLE

TECHNICAL FIELD

The present invention generally relates to electrical circuit, and more specifically relates to isolated resonant converters with fixed output ripple and associated control methods.

BACKGROUND

Isolated resonant converters have become increasingly popular in recent years, which are intended to improve the power density, reduce or eliminate switching loss and reduce EMI. Additionally, with the introduction of high speed composite semiconductor switching transistors, the isolated resonant converters are capable of operation at greatly increased switching frequencies, for example, up to and greater than 10 MHz.

FIG. 1 schematically illustrates a prior isolated resonant converter 100. The isolated resonant converter 100 comprises an input DC/AC stage 101 on a primary side, a resonant tank 102 including an isolated transformer, and an output AC/DC stage 103 on a secondary side. During operation, a controller 104 on the primary side activates and deactivates switching transistors of the DC/AC stage 101 such that energy from the primary side of the isolated transformer 100 is transferred to the secondary side of the isolated transformer. In order to regulate the required output (output voltage and/or current) at the output of the AC/DC stage 103, a feedback operation is employed to communicate e.g. the output signal on the secondary side to the controller 104 on the primary side, to generate control signals of the switching transistors of the DC/AC stage 101. The output voltage Vout is sensed by a voltage-dividing circuit 105. This feedback operation for isolating output voltage sensing between the secondary side and the primary side is normally achieved by using an error loop 106 including an error amplifier with compensation network and an opto-coupler, which is illustrated in FIG. 1. However, the problem with this isolation implementation is that the opto-coupler is generally slow, i.e. delay times of one to ten microseconds, and the temperature variations will affect a voltage error signal VE which is used as the feedback signal on the primary side.

FIG. 2 illustrates an alternative means for isolating output voltage sensing. The voltage error signal VE at the output of the error amplifier is applied to an input of an A/D converter and then is transferred to the controller 104 on the primary side through a digital isolator and a D/A converter. In this solution, the speed and the resolution of the D/A converter and A/D converter is a function of loop band width and the output error requirements. In addition, the A/D converter on the secondary side has a lower speed since most loop band widths are much lower.

SUMMARY

In view of the above requirements, there has been provided, in accordance with an embodiment of the present disclosure, an isolated resonant converter. The isolated resonant converter comprises: an analog comparator with hysteresis, a digital isolator, an oscillator and a primary pulse width modulator. The analog comparator is configured to control an output voltage of the isolated resonant converter within a predefined range and configured to generate a first ON/OFF signal. The digital isolator is coupled to the analog comparator to receive the first ON/OFF signal and configured to generate a second ON/OFF signal electrically isolated from the first ON/OFF signal. The oscillator is configured to generate a clock pulse signal with a frequency. The primary pulse width modulator is coupled to receive the clock pulse signal and the second ON/OFF signal, wherein the primary pulse width modulator is configured to control the switching of the isolated resonant converter in response to the clock pulse signal during logic high state of the second ON/OFF signal, and is configured to stop the switching of the isolated resonant converter during logic low state of the second ON/OFF signal.

BRIEF DESCRIPTION OF THE DRAWING

The present invention can be further understood with reference to the following detailed description and the appended drawings.

Figure 1:
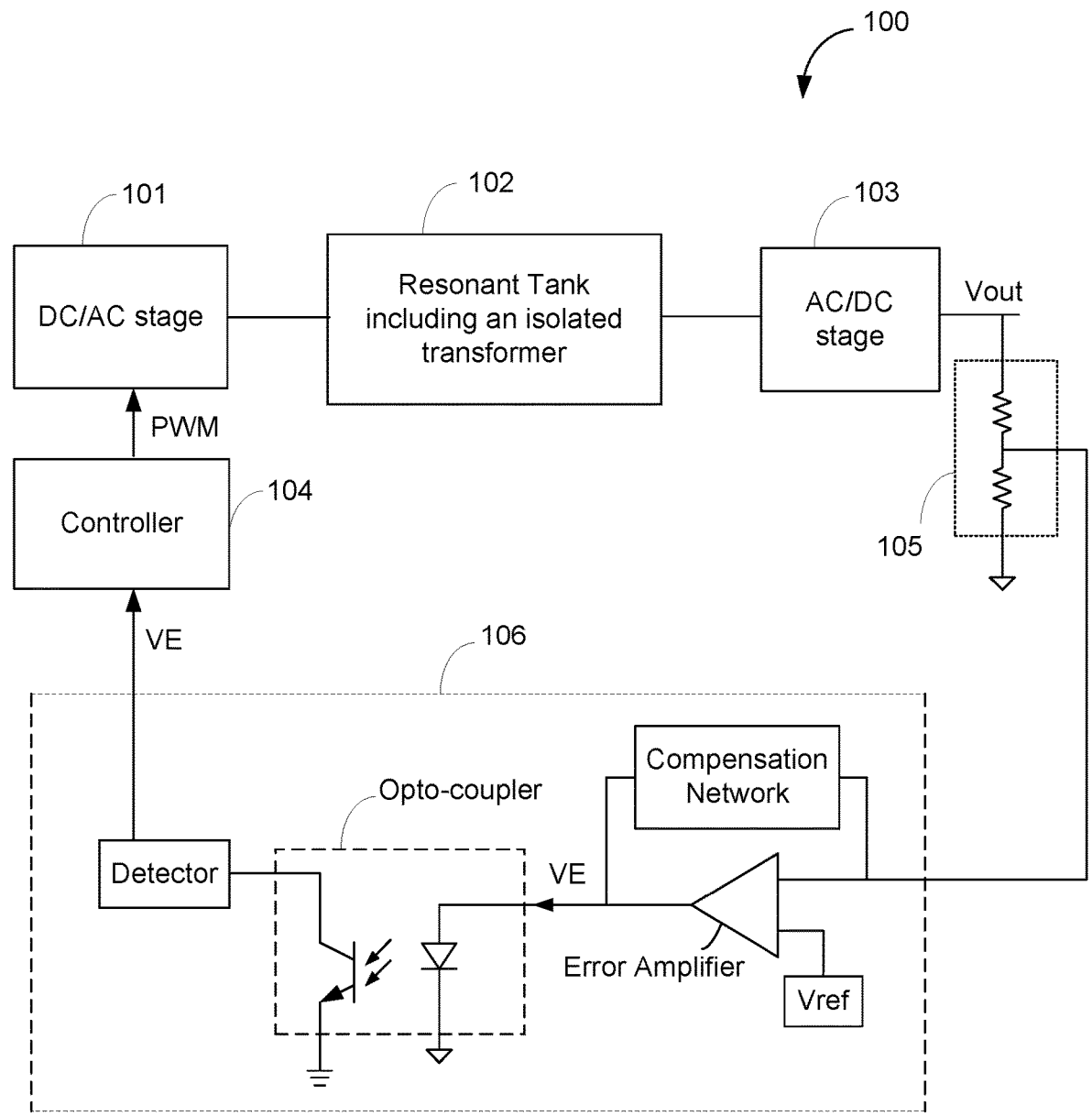
FIG. 1 schematically illustrates a prior isolated resonant converter 100.

The use of the same reference label in different drawings indicates the same or like components.

DETAILED DESCRIPTION

Various embodiments of the technology will now be described. In the following description, some specific details, such as example circuits and example values for these circuit components, devices or process, are included to provide a thorough understanding of embodiments. One skilled in the relevant art will recognize, however, that the technology can be practiced without one or more specific details, or with other methods components, materials, etc.

Throughout the specification, the terms "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. Moreover, the drawings are only for illustration purpose. Usually, these drawings are not necessarily drawn to scale. Persons of ordinary skill in the art will appreciate that the terms "coupled" or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

In most applications, the ripple voltage at the output of an isolated resonant converter should be maintained within certain limits. This requires the isolated resonant converter operating in burst mode, and each burst of switching can be started at a minimum value of the output voltage and stopped at a maximum value of the output voltage. Furthermore, if a positive load step occurs during the period when the isolated resonant converter is not switching, the isolated resonant converter has to react relatively fast to prevent a sudden drop in output voltage due to a lack of available power, this requires that a voltage error signal from an output voltage regulation loop to start the next burst as soon as possible. As mentioned above, the output voltage regulation loop is normally achieved using an error loop including an error amplifier with compensation network and an opto-coupler. The voltage error signal at the primary side opto-coupler output is used to start and stop the burst of switching, starting each burst when a voltage error signal at the primary side opto-coupler output rises above a predefined maximum value and stopping each burst when it falls below a predefined minimum value gives almost constant output ripple voltage. However, the problem with this approach is that the primary side output of opto-coupler or error amplifier saturates causes the shape of the AC part of the output voltage to be different from the shape of the AC part of the voltage error signal at the primary side of the error loop. This means minimum and maximum values of the output voltage do not correspond with the minimum and maximum values at the primary side opto-coupler output.

Also, the power level of the isolated resonant converter and the points at which each burst starts and stops are coupled. The power level is controlled by the voltage error signal at the primary side output of opto-coupler. For resonant converters, the actual voltage at the primary side output of opto-coupler required to obtain a certain output power can vary significantly depending on the value and tolerance of the resonant components. This means that using a fixed voltage at the primary side output of opto-coupler to start and stop the burst makes it difficult to define the required power level during the burst. The design of isolated resonant converter employing this technique is complicated.

In accordance with a first aspect of the invention, there is provided an isolated resonant converter. The isolated resonant converter comprises: an analog comparator with hysteresis, a digital isolator, an oscillator and a primary pulse width modulator. The analog comparator is configured to control an output voltage of the isolated resonant converter within a predefined range and configured to generate a first ON/OFF signal. The digital isolator is coupled to the analog comparator to receive the first ON/OFF signal and configured to generate a second ON/OFF signal electrically isolated from the first ON/OFF signal. The oscillator is configured to generate a clock pulse signal with a frequency. The primary pulse width modulator is coupled to receive the clock pulse signal and the second ON/OFF signal, the primary pulse width modulator is configured to control the switching of the isolated resonant converter in response to the clock pulse signal during logic high state of the second ON/OFF signal, and is configured to stop the switching of the isolated resonant converter during logic low state of the second ON/OFF signal.

Figure 3:
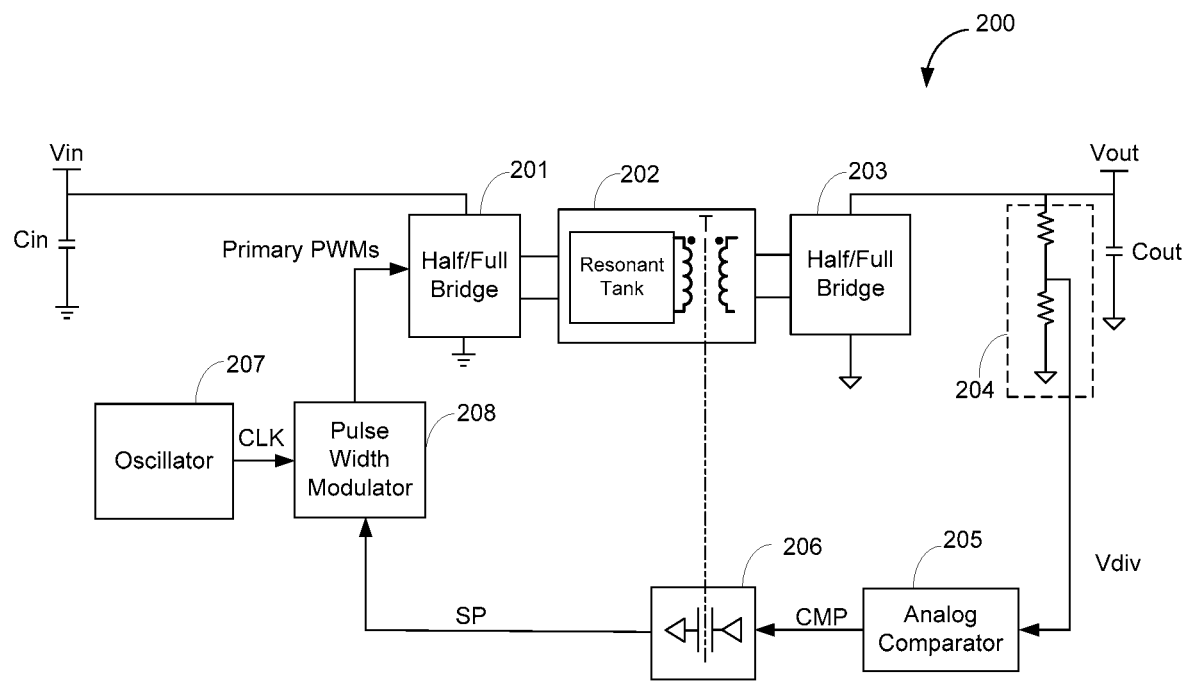
FIG. 3 schematically illustrates an isolated resonant converter 300 with fixed output ripple in accordance with an embodiment of the present invention.

FIG. 3 schematically illustrates an isolated resonant converter 300 with fixed output ripple in accordance with an embodiment of the present invention.

The isolated resonant converter 300 comprises an input DC/AC stage 201 on a primary side, a resonant tank 202 including a transformer T, an output AC/DC stage 203 on a secondary side, an analog comparator 205, a digital isolator 206, an oscillator 207 and a primary pulse width modulator 208. As shown in FIG. 3, the DC/AC stage 201 is configured to receive a DC input voltage Vin at the input across an input capacitor Cin. The DC/AC stage 201 may include two active switches (e.g., MOSFETs) coupled to the resonant tank 202, which are in turn coupled a primary winding of the transformer T. The primary winding exchanges power with a second winding of the transformer T. The secondary winding is coupled to the secondary AC/DC stage 203 that may include a bridge configuration of four active switches (e.g., MOSFETs). The AC/DC stage 203 is configured to generate an output voltage Vout at the output across a filter capacitor Cout.

The output voltage Vout can be sensed by a voltage-dividing circuit 204. The voltage-dividing circuit 204 is configured to transform the output voltage Vout into a divided voltage Vdiv at an output terminal. The analog comparator 205 with hysteresis is coupled to the output terminal of the voltage-dividing circuit 204 and is used to control the output voltage Vout within a specified range and generates a first ON/OFF signal CMP. In one embodiment, when the output voltage Vout rises above a high threshold voltage VTH, the analog comparator 205 output becomes low, the first ON/OFF signal CMP becomes low from High. When the output voltage Vout drops below a low threshold voltage VTL, the analog comparator 205 output becomes high, the first ON/OFF signal CMP becomes high from low.

The digital isolator 206 has a first input terminal and a first output terminal, wherein the first input terminal is couple to the output terminal of the analog comparator 205 to receive the first ON/OFF signal CMP. Based on the first ON/OFF signal CMP, the digital isolator 206 generates a second ON/OFF signal SP electrically isolated from the first ON/OFF signal CMP at the first output terminal. The second ON/OFF signal SP is synchronized with the first ON/OFF signal CMP and has two states: logical high state and logical low state. The digital isolator 206 can offer higher reliability than an opto-coupler and provide faster propagation time and better parametric stability. The digital isolator 206 output is either logical low or logical high, with none of the ambiguous output states found in the opto-coupler and excellent threshold stability.

The oscillator 207 is configured to provide a clock pulse signal CLK with a frequency fclk. The primary pulse width modulator 208 has a first input terminal, a second input terminal and a first output, wherein the first input terminal is coupled to the first output terminal of the digital isolator to receive the second ON/OFF signal SP, the second input terminal is coupled to the oscillator 207 to receive the clock pulse signal CLK. The primary pulse width modulator 208 is configured to generate primary PWM signals for controlling the switching of the isolated resonant converter 300 in response to the clock pulse signal CLK during the logic high state of the second ON/OFF signal SP, and is configured to stop the switching of the isolated resonant converter during the logic low state of the second ON/OFF signal SP. The pulse width modulator 208 is configured to provide the primary PWM signals for driving the active switches of the DC/AC stage 201. In various examples, the pulse width modulator 208 can support both half bridge, such as LLC half bridge, or full bridge topologies of the DC/AC stage 201.

In one embodiment, the isolated resonant converter 300 further comprises first and second drivers coupled to drive the active switches of the DC/AC stage 201 in response to the clock pulse signal CLK during the logic high state of the second ON/OFF signal SP. In one embodiment, the pulse width modulator 208 generates complementary gating signals having a 50% duty cycle through the first and second drivers to switch the active switches of a LLC half bridge.

Figure 4:
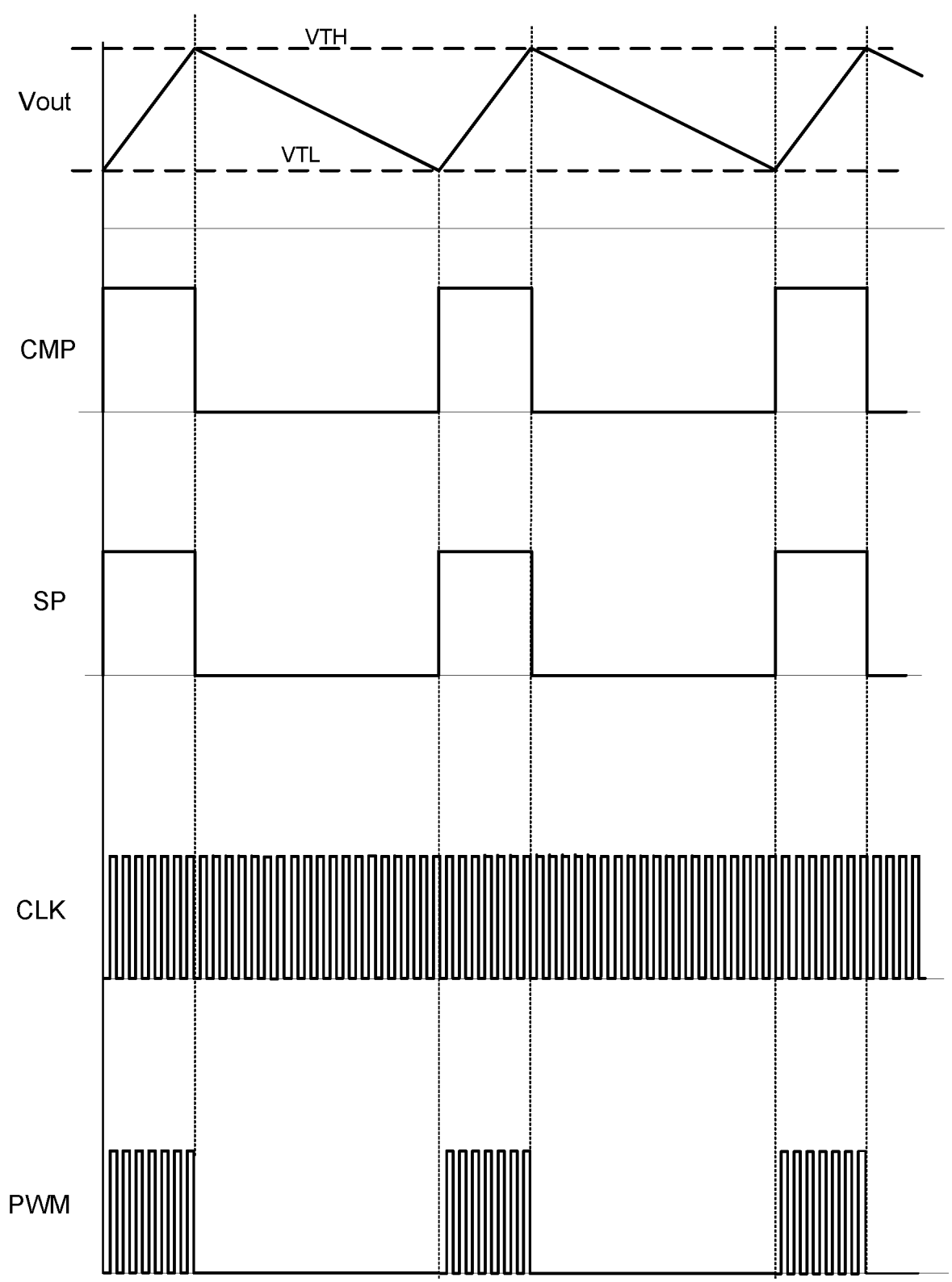
FIG. 4 schematically illustrates a waveform diagram of the isolated resonant converter 300 shown in FIG. 3 in accordance with an embodiment of the present invention.

FIG. 4 schematically illustrates a waveform diagram of the isolated resonant converter 300 shown in FIG. 3 in accordance with one embodiment of the present invention.

The isolated resonant converter 300 shown in FIG. 3 utilizes a primary side regulation. During operation, when the output voltage Vout rises above the high threshold voltage VTH, the first ON/OFF signal CMP becomes low from high. At the almost same time, the second ON/OFF signal SP outputted by the digital isolator 206 is also changed from logical low into logical high. During the logic high state of the second ON/OFF signal SP, the primary pulse width modulator 208 is configured to pass the clock pulse signal CLK to provide complementary non-overlapping primary PWM signals that drives the active switches in the DC/AC stage 201.

During operation, if the output voltage Vout of the isolated resonant converter 300 drops below the low threshold voltage VTL, the first ON/OFF signal CMP becomes high from low. At the almost same time, the second ON/OFF signal SP outputted by the digital isolator 206 is also changed from logical high into logical low. During the logic low state of the second ON/OFF signal SP, the clock pulse signal CLK is blocked the active switches in the DC/AC stage 201 are turned OFF.

Figure 2:
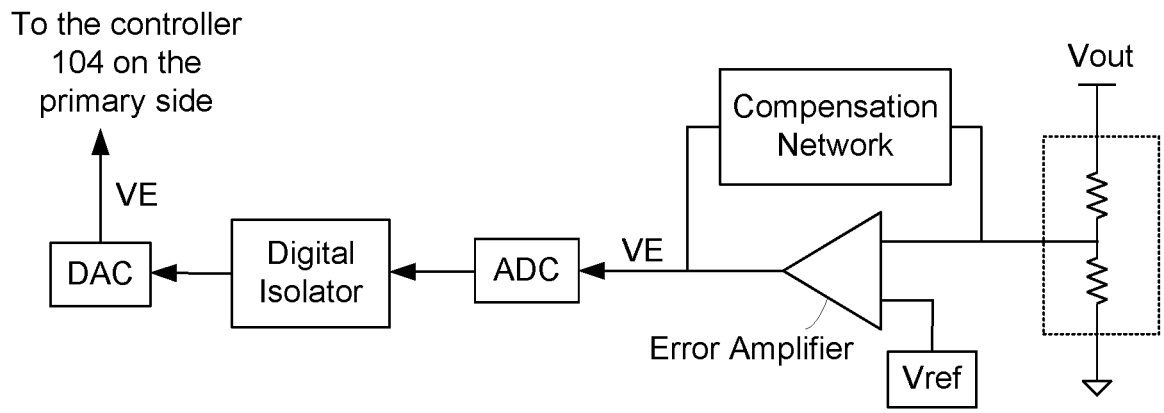
FIG. 2 illustrates an alternative means for isolating output voltage sensing between a secondary side and a primary side.

Compared with the isolated resonant converter of FIGS. 1 and 2, the isolated resonant converter 300 can offer faster and more precise feedback operation, eliminating the need of the D/A converter and A/D converter of FIG. 2 as well as the need of the error amplifier and compensation network. As a result, total system cost is saved and total power solution size is greatly reduced, and the bill of materials (BOM) is reduced.

Figure 5:
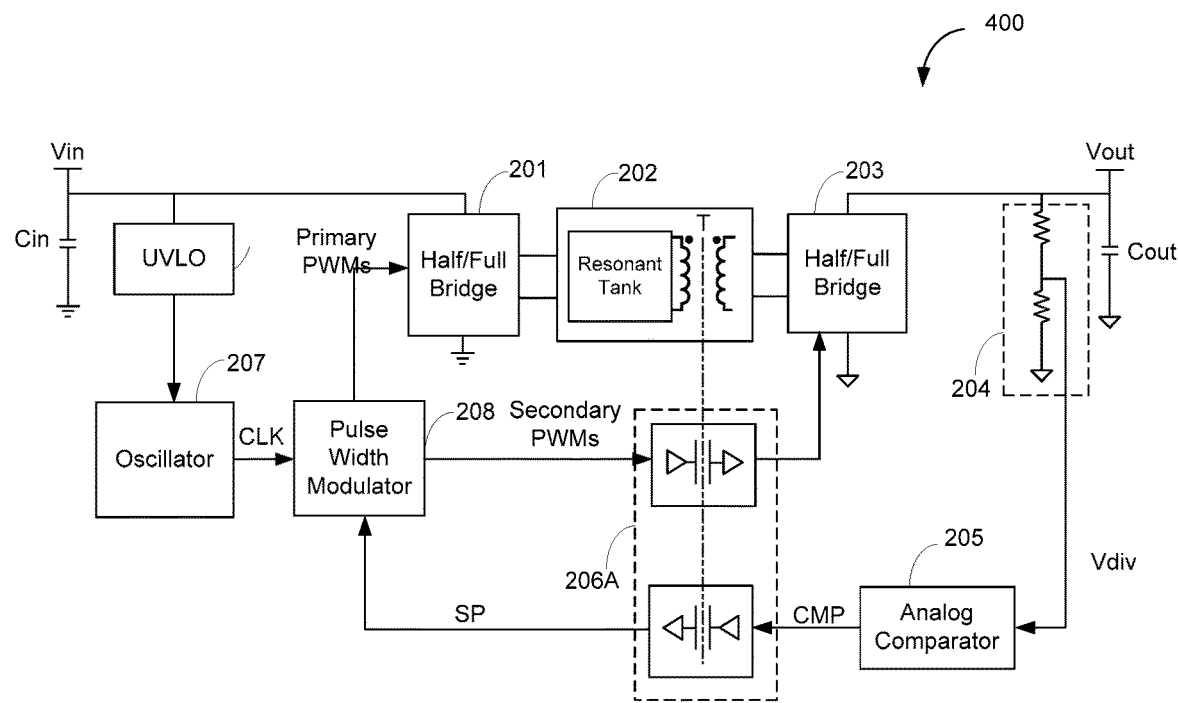
FIG. 5 schematically illustrates an isolated resonant converter 400 with fixed output ripple in accordance with another embodiment of the present invention.

FIG. 5 schematically illustrates an isolated resonant converter 400 with fixed output ripple in accordance with another embodiment of the present invention.

The isolated resonant converter 400 of FIG. 5 are different from the isolated resonant converter 300 of FIG. 3 in that the digital isolator 206A further has a second input coupled to the pulse width modulator 208 and a second output coupled to the DC/AC stage 203 on the secondary side. The digital isolator 206A is configured to communicate the information between the primary side and the secondary side. The feedback information from the secondary side to the primary side is transferred using a first channel, and the secondary control information from the primary side to the secondary side is transferred using a second channel that different from the first channel. As shown in the embodiment of FIG. 5, the pulse width modulator 208 is further configured to provide secondary PWM signals to active switches of the AC/DC stage 203 via the digital isolator 206A.

In one embodiment, the transformer T comprises an air-core PCB transformer, and the digital isolator 206 can be integrated inside a IC, and thus the all-in-one integrated isolated resonant converter IC may be obtained, especially excellent in lower-power operation.

In one embodiment, the logic high state duration of the second ON/OFF signal SP is measured and compared with a time reference, in order to measure load condition or input voltage condition. If a load coupled to the output of the isolated resonant converter 300 decreases, or if the input voltage increases, the output voltage Vout will ramp up faster than desired, the time when the output voltage Vout charges from VTL to VTH through the filter capacitor Cout decreases, the logic high state duration of the second ON/OFF signal SP will be less than the time reference. However, in prior art, the measurement of the load condition requires a voltage error signal from the output voltage regulation loop including an error amplifier with compensation network and the opto-coupler (e.g., shown in FIG. 1). And an input voltage detection circuit is necessary for the information of the input voltage in prior art.

Figure 6:
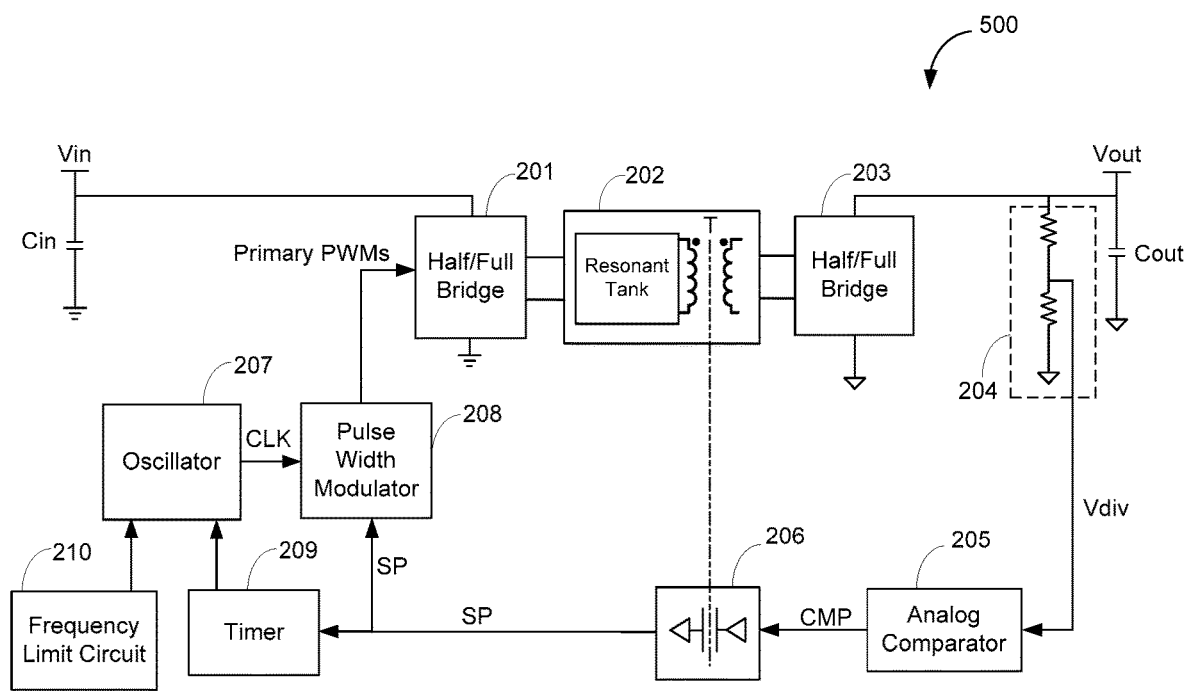
FIG. 6 schematically illustrates an isolated resonant converter 500 with fixed output ripple in accordance with yet another embodiment of the present invention.

FIG. 6 schematically illustrates an isolated resonant converter 500 with fixed output ripple in accordance with yet another embodiment of the present invention. The isolated resonant converter 500 of FIG. 6 are different from the isolated resonant converter 300 of FIG. 3 in that a timer 209 and a frequency limit circuit 210 are further shown on the primary side. The timer 209 has an input terminal and an output terminal, wherein the input terminal is coupled to the first output terminal of the digital isolator 206 to receive the second ON/OFF signal SP. The timer 209 measures the logic high state duration of the second ON/OFF signal SP and generates a time control signal tctrl at the output terminal to the oscillator 207 for adjusting the frequency of the clock pulse signal.

The oscillator 207 is coupled to the output terminal of the timer 209 to receive the time control signal tctrl and is configured to adjust the frequency fclk of the clock pulse signal CLK based on the time control signal tctrl.

In the embodiment of FIG. 6, the frequency limit circuit 210 is coupled to the oscillator 207 to limit the frequency fclk of the clock pulse signal CLK within an appropriate frequency range (between a minimum frequency FMIN and a maximum frequency FMAX) to reduce losses. Thus the switching frequency of the isolated resonant converter 300 is also limited in the frequency range. In applications, for a well-designed LLC resonant circuit, the LLC resonant circuit switching frequency varies in a range around series resonant frequency.

During operation, if the load becomes low, the output voltage Vout ramps up faster than desired, and when the logic high state duration of the second ON/OFF signal SP is less than a minimum time period Tmin, the oscillator 207 is configured to increase the frequency fclk by a predetermined value $\Delta f$ in response to the logic high state duration of the second ON/OFF signal SP being less than the minimum time period Tmin, and thus less power is transferred to the secondary side. In a further embodiment, if the load becomes very low, the logic high state duration of the second ON/OFF signal SP continues to be less than the minimum time period Tmin, and the frequency fclk of the clock pulse signal CLK continues to increase. To prevent this very high frequency condition from occurring, the LLC resonant circuit of power converter 100 has the maximum frequency FMAX in accordance with the teachings of the present invention. This is because large changes in frequency have little impact on power transfer if the switching frequency is increased to very high and is greater than series resonant frequency. Accordingly, when the frequency fclk increases to reach the maximum frequency FMAX, it is limited to the maximum frequency FMAX by the frequency limit circuit 210 even if the load keeps decreasing.

During operation, if the load becomes heavy, the output voltage Vout ramps up slower than desired. When the logic high state duration of the second ON/OFF signal SP is greater than a maximum time period Tmax, the oscillator

207 is configured to decrease the frequency fclk by the predetermined value Δf in response to the logic high state duration of the second ON/OFF signal SP being greater than the maximum time period Tmax. In one embodiment, when the frequency fclk decreases to reach a minimum frequency FMIN, it is limited to the minimum frequency FMIN by the frequency limit circuit 210 even if the load keeps increasing. In one embodiment, for example, for the LLC resonant converter, the minimum frequency FMIN is greater than the parallel resonant frequency of the LLC resonant circuit, to guarantee the power train appears as inductive.

Figure 7:
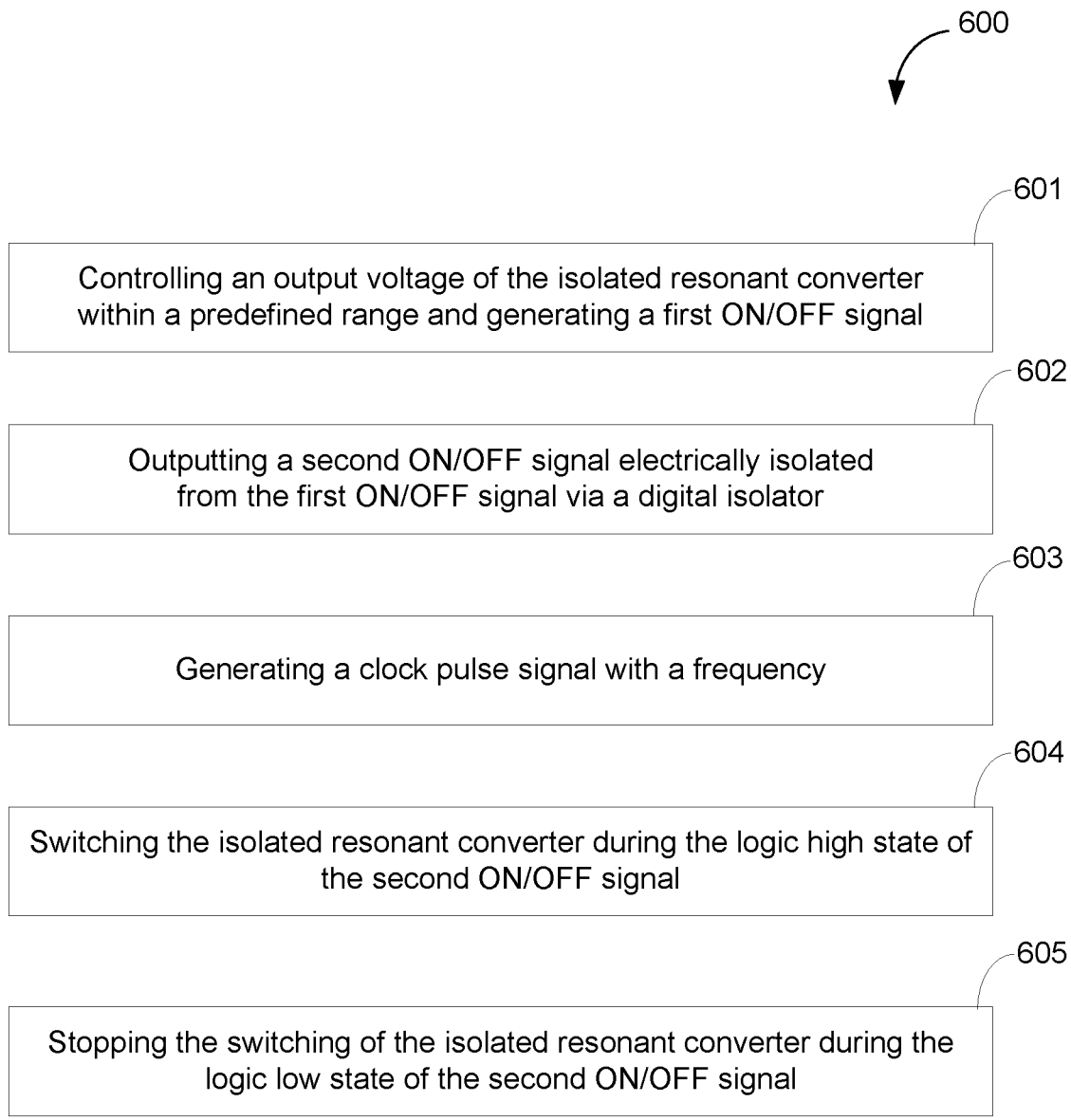
FIG. 7 schematically illustrates a flow chart of a method 600 for controlling an isolated resonant converter in accordance with an embodiment of the present invention.

FIG. 7 schematically illustrates a flow chart of a method 600 for controlling an isolated resonant converter in accordance with an embodiment of the present invention. The method 600 comprises steps S601-S605.

At step S601, an output voltage is controlled within a predefined range and a first ON/OFF signal is generated by using an analog comparator with hysteresis. In one embodiment, when the output voltage rises above a high threshold voltage, the first ON/OFF signal becomes low, and when the output voltage drops below a low threshold voltage, the first ON/OFF signal becomes high.

At step S602, a second ON/OFF signal is generated at a digital isolator output and is isolated from the first ON/OFF signal. The second ON/OFF signal is synchronized with the first ON/OFF signal.

At step S603, a clock pulse signal with a frequency is generated. In one embodiment, the frequency of the clock pulse signal is decreased by a predetermined value in response to the logic high state duration of the second ON/OFF signal being greater than a maximum time period, and increased by the delta frequency in response to the logic high state duration of the second ON/OFF signal being less than a minimum time period.

At step S604, the switching of the isolated resonant converter is controlled in response to the clock pulse signal during the logic high state of the second ON/OFF signal. In one embodiment, for example, for a LLC resonant converter, the clock pulse signal is passed to a driver for driving active switches of a half bridge coupled to a LLC resonant tank.

At step S605, the switching of the isolated resonant converter is stopped during the logic low state of the second ON/OFF signal. In one embodiment, the active switches of the half bridge coupled to the LLC resonant tank are turned OFF.

In one embodiment, the frequency of the clock pulse signal is controlled and limited between a minimum frequency and a maximum frequency to reduce losses.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. An isolated resonant converter, comprising:
   an analog comparator with hysteresis configured to control an output voltage of the isolated resonant converter within a predefined range and configured to generate a first ON/OFF signal;
   a digital isolator coupled to the analog comparator to receive the first ON/OFF signal and configured to generate a second ON/OFF signal electrically isolated from the first ON/OFF signal;
   an oscillator configured to generate a clock pulse signal with a frequency; and
   a primary pulse width modulator coupled to receive the clock pulse signal and the second ON/OFF signal, wherein the primary pulse width modulator is configured to control switching of the isolated resonant converter in response to the clock pulse signal during logic high state of the second ON/OFF signal, and is configured to stop the switching of the isolated resonant converter during logic low state of the second ON/OFF signal;
   wherein when the output voltage rises above a high threshold voltage, the first ON/OFF signal becomes low, the second ON/OFF signal is switched from high to low, and when the output voltage drops below a low threshold voltage, the first ON/OFF signal becomes high, the second ON/OFF signal is switched from low to high; and
   wherein the frequency of the clock pulse signal is decreased by a predetermined value in response to the logic high state duration of the second ON/OFF signal being greater than a maximum time period, and the frequency of the clock pulse signal is increased by the predetermined value in response to the logic high state duration of the second ON/OFF signal being less than a minimum time period.

2. The isolated resonant converter of claim 1, further comprises a timer, wherein the timer is configured to receive the second ON/OFF signal and measure the logic high state duration of the second ON/OFF signal, and provide a time control signal to the oscillator.

3. The isolated resonant converter of claim 1, wherein the frequency of the clock pulse signal is limited between a minimum frequency and a maximum frequency.

4. The isolated resonant converter of claim 3, wherein the isolated resonant converter is an LLC resonant converter, and
   wherein the minimum frequency of the oscillating clock signal is set to configure the LLC resonant converter operating above a parallel resonant frequency of an LLC resonant tank of the LLC resonant converter.

5. The isolated resonant converter of claim 1, further comprising first and second drivers coupled to drive a half bridge circuit coupled to a resonant tank during the logic high state of the second ON/OFF signal.

6. An LLC resonant converter with an LLC tank including a transformer, comprising:
   a DC/AC stage coupled to a primary winding of the transformer;
   an AC/DC stage coupled to a secondary winding of the transformer, wherein the AC/DC stage has an output to provide an output voltage;
   an analog comparator with hysteresis configured to control the output voltage within a predefined range and configured to generate a first ON/OFF signal;
   a digital isolator coupled to the analog comparator to receive the first ON/OFF signal and configured to generate a second ON/OFF signal electrically isolated from the first ON/OFF signal;
   an oscillator configured to generate a clock pulse signal with a frequency; and
   a primary pulse width modulator coupled to receive the clock pulse signal and the second ON/OFF signal, and wherein the primary pulse width modulator is configured to control the switching of the LLC resonant converter in response to the clock pulse signal during logic high state of the second ON/OFF signal, and is configured to stop the switching of the LLC resonant converter during logic low state of the second ON/OFF signal;

wherein when the output voltage rises above a high threshold voltage, the first ON/OFF signal becomes low, the second ON/OFF signal is switched from low to high, and when the output voltage drops below a low threshold voltage, the first ON/OFF signal becomes high, the second ON/OFF signal is switched from low to high to low; and wherein the frequency of the clock pulse signal is decreased by a predetermined value in response to the logic high state duration of the second ON/OFF signal being greater than a maximum time period, and the frequency of the clock pulse signal is increased by the predetermined value in response to the logic high state duration of the second ON/OFF signal being less than a minimum time period.

7. The LLC resonant converter of claim 6, further comprises a timer, wherein the timer is configured to receive the second ON/OFF signal and measures the logic high state duration of the second ON/OFF signal, and provides a time control signal to the oscillator for adjusting the frequency of the clock pulse signal.

8. The LLC resonant converter of claim 6, wherein the frequency of the clock pulse signal is limited between a minimum frequency and a maximum frequency.

9. The LLC resonant converter of claim 8, wherein the minimum frequency of the oscillating clock signal is set to configure the LLC resonant converter operating above a parallel resonant frequency of the LLC tank.

10. The LLC resonant converter of claim 6, further comprising first and second drivers coupled to drive active switches of the DC/AC stage.

11. The LLC resonant converter of claim 6, wherein the primary pulse width modulator is further configured to drive active switches of the AC/DC stage via the digital isolator.

12. A method of controlling an isolated resonant converter, comprising:

controlling an output voltage of the isolated resonant converter within a predefined range using an analog comparator with hysteresis and generating a first ON/OFF signal;

generating a second ON/OFF signal electrically isolated from the first ON/OFF signal via a digital isolator;

generating a clock pulse signal with a frequency;

switching the isolated resonant converter in response to the clock pulse signal during logic high state of the second ON/OFF signal;

stopping the switching of isolated resonant converter during logic low state of the second ON/OFF signal;

wherein when the output voltage rises above a high threshold voltage, the first ON/OFF signal becomes low, the second ON/OFF signal is switched from high to low, and when the output voltage drops below a low threshold voltage, the first ON/OFF signal becomes high, the second ON/OFF signal is switched from low to high;

decreasing the frequency of the clock pulse signal by a predetermined value in response to the logic high state duration of the second ON/OFF signal being greater than a maximum time period; and increasing the frequency of the clock pulse signal by the predetermined value in response to the logic high state duration of the second ON/OFF signal being less than a minimum time period.

13. The method of claim 12, further comprising:

sending the second ON/OFF signal to a timer;

measuring the logic high state duration of the second ON/OFF signal using the timer and generating a time control signal; and adjusting the frequency of the clock pulse signal based on the time control signal.

14. The method of claim 12, further comprising limiting the frequency of the clock pulse signal between a maximum frequency and a minimum frequency.

* * * * *